United States Patent [19]

Porter

[11] 4,198,118
[45] Apr. 15, 1980

[54] POWER EQUALIZING MULTIPORT OPTICAL COUPLER

[75] Inventor: David R. Porter, Seattle, Wash.

[73] Assignee: The Boeing Company, Seattle, Wash.

[21] Appl. No.: 909,874

[22] Filed: May 26, 1978

Related U.S. Application Data

[63] Continuation of Ser. No. 726,873, Sep. 27, 1976, abandoned.

[51] Int. Cl.² .................................................. G02B 5/16
[52] U.S. Cl. .............................. 350/96.16; 350/96.15; 350/96.18
[58] Field of Search ................ 350/96.15, 96.16, 96.18

[56] References Cited

U.S. PATENT DOCUMENTS

| 2,981,826 | 4/1961 | Mattern | 350/96.16 |
|---|---|---|---|
| 3,780,295 | 12/1973 | Kapron et al. | 350/96.15 |
| 3,874,780 | 4/1975 | Love | 350/96.16 |
| 3,883,217 | 5/1975 | Love et al. | 350/96.16 |
| 3,936,141 | 2/1976 | Milton | 350/96.16 |
| 4,021,099 | 5/1977 | Kawasaki et al. | 350/96.18 |

*Primary Examiner*—Stewart J. Levy
*Attorney, Agent, or Firm*—Lynn H. Hess; B. A. Donahue

[57] ABSTRACT

An apparatus for controlling the attenuation of optical coupling between remote terminals or ports on the same optical coupler. The attenuator employed is a partially reflecting mirrored surface located on the end of a mixing block with a portion of one surface of the mirror coated with an attenuation material. In an alternate embodiment, the attenuator is a mirrored surface separated from a mixing rod by a selectively variable distance.

16 Claims, 3 Drawing Figures

POWER EQUALIZING MULTIPORT OPTICAL COUPLER

This is a continuation of application Ser. No. 726,873, filed Sept. 27, 1976, now abandoned.

BACKGROUND OF THE INVENTION

1. Field of Invention

The present invention relates to a multiport coupler for use in fiber optic data bus systems in which the optical signal attenuation between any two-port or remote terminal combination is substantially equal regardless of terminal location.

2. Description of Prior Art

Trends in aircraft avionic systems point to the use of fiber optic technology as a reliable means of digital data transmission of intra-aircraft signals between aircraft remote terminals. Data transmission concepts utilizing optical fibers offers several important advantages unmatched by conventional wire technology. A fiber optic link can carry extremely wideband information, is virtually immune to external electromagnetic disturbances, and will not interfere with existing aircraft systems. These properties make fiber optics an ideal transmission medium for applications where highly reliable data transmission is required. Of increasing importance, especially in commercial aircraft applications, is a data transmission system's immunity to lightning discharges. Metal aircraft skins provide some protection to signal wiring against the effects of lightning discharges, but the increased use of carbon fiber composite materials in aircraft to achieve weight performance advantages reduces this protection. Consequently, fiber optic data links offer an attractive way to provide such protection for intra-airplane signals.

Digital integration of advanced avionic systems offers potential weight savings, increased flexibility, and improved performance for future commercial and military aircraft. It is almost certain that these integration techniques will employ fiber optic digital data buses for efficient transfer of information between aircraft remote terminals.

The most popular hardwire serial data bus configuration utilizes tee couplers, or taps, dispersed along a transmission line. A remote terminal is then attached to each tee coupler. This configuration, while convenient, imposes severe limitations on fiber optic data buses. With current technology, series losses through many such tee couplers limits the data bus to a few remote terminals.

An alternate fiber optic data bus system that has been widely discussed is the star configuration. In this approach, a plurality of remote terminals connected to fiber optic cables are brought together at a single point by a star coupler. In this configuration, a signal from any one terminal is distributed equally to all other terminals. Performance of the star data bus is close to optimum, but the resulting cabling configuration is not convenient for aircraft applications where avionic equipment centers or remote terminals are widely separated or cable runs are severely restricted.

A third fiber optic data bus system designed specifically for aircraft application is the hybrid concept in which elements of the tee and star data buses are combined. In this approach, a plurality of remote terminals are joined at central points by power equalizing multiport optical couplers which are dispersed along a transmission line. As in the star configuration, the optical signal attenuation between all possible remote terminals is substantially the same regardless of terminal location. Such a configuration requires fewer connectors than does the tee configuration, has shorter cable runs than does the star configuration, and is very ammeanable to aircraft installation.

The key optical component in a fiber optic data bus configuration is the optical coupler. In such systems where signals must be divided between several remote terminals, it becomes important to insure that such division is uniform; otherwise some terminals receive a strong signal at the expense of others. The tee coupler, as exemplified in Brown, U.S. Pat. No. 3,902,786, is inherently lossy, consequently a data bus utilizing such couplers is restricted to applications where only a few remote terminals, normally less than 10, are required. The star coupler, of which Theil, U.S. Pat. No. 3,874,781, is an example, is more suited for data bus application; however, it imposes a severe constraint on the configuration of such a data bus and potentially may require long cable runs. On large commercial aircraft, such a configuration would be inconvenient to install.

A star coupler has the desirable property of providing a substantially equal attenuation between all two-port (or terminal) combinations in a star configured data bus. The power equalizing multiport optical coupler of the present invention achieves this result for the hybrid configured data bus. A hybrid configured data bus arbitrarily constructed with star couplers would not provide equal attenuations between all possible two-port combinations.

DESCRIPTION OF THE PREFERRED EMBODIMENT

Figure 1:
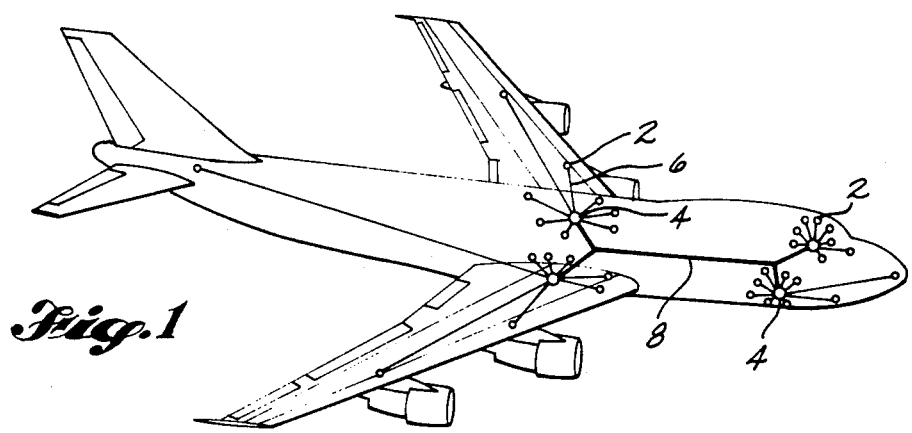
FIG. 1 shows a typical hybrid data bus installation within an aircraft.

A fiber optic data system utilizing the present invention within an aircraft is shown in FIG. 1. A plurality of remote terminals 2, located at critical points throughout the aircraft, are connected to a plurality of power equalizing multiport optical couplers 4 by fiber optic cable 6 which may be implemented with a bundle of optical fibers or a single optical fiber. Power equalizing multiport optical couplers 4 are connected to other couplers 4 by main bus line 8 which is also a fiber optic cable implemented with a bundle of optical fibers or a single optical fiber.

As in all optical data buses where signals enter a junction point and are then divided, it becomes important that each terminal or port on every coupler receive equal strength signals or the data system will suffer adverse performance effects. One key performance parameter that is particularly important in fiber optic data bus systems is the optical signal range (hereinafter OSR). The OSR is defined as the ratio of the maximum to minimum optical signal power as seen by any remote terminal 2 on data bus 8 and is usually expressed in dB. It is important to minimize the OSR especially in a fiber optic time-division multiplex data bus, such as the hybrid configuration, that employs intensity modulation and direct signal detection. Any change in the received optical signal average power is seen as an average DC voltage shift at remote terminal 2 receiver output. This complicates the design of remote terminal 2 receiver in that it must adapt to the varying signal levels to achieve the specified bit error rate performance under all conditions. Such adaptation is difficult to achieve when message synchronization patterns and dead time between messages are kept small to minimize communications overhead. This problem can be somewhat rectified by the receiver and associated decoder electronics within remote terminal 2. A discussion of techniques used to offset the adverse effects of extreme OSR can be found in the literature; however, the design and implementation of the hybrid fiber optic data bus remote terminals is greatly simplified when OSR is minimized.

As has been discussed, the hybrid data bus configuration has the advantage of having a lower loss than the tee configured data bus and its configuration is more acceptable for large aircraft use than the star configuration. However, for the hybrid approach to be viable, the optical signal range must be reduced to a low level as a consequence of the unipolar nature of light. The power equalizing multiport coupler of the present invention reduces the OSR of the hybrid configured fiber optic data bus by the intentional addition of optical attenuation between ports on the same coupler such that the attenuations between any two ports, either on the same coupler or between couplers, are substantially equal.

Figure 2:
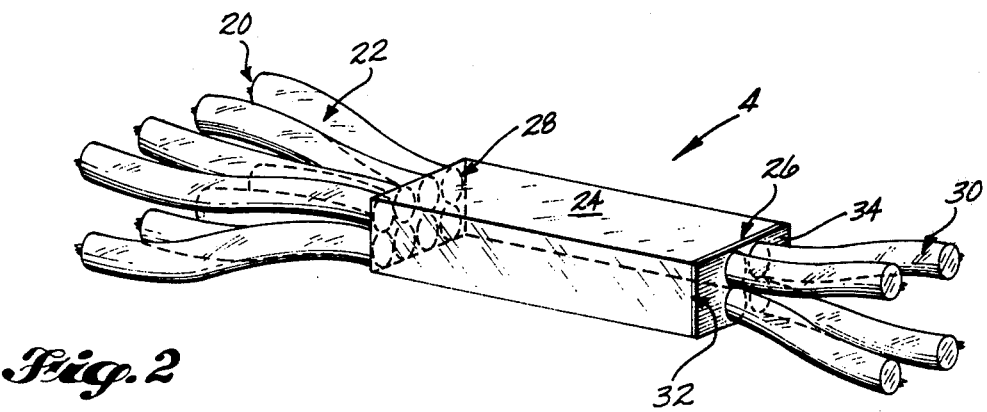
FIG. 2 shows the preferred embodiment of a coupler according to the present invention.

FIG. 2 shows the preferred coupler of the present invention. Light, representing the modulated data signal or input signal from an optical transmitter or transceiver, enters coupler 4 through cable 6. It is coupled from one of input-output ports 20 by cladded glass coupling rod 22, expanded and internally reflected by mixing block 24, and uniformly distributed over end 26 of mixing block 24. Cladding is normally required to insure that total internal reflection of light occurs within the core material of rod 22 or block 24.

Mixing block 24 is a cladded glass rectangular block whose core area is substantially equal to the bundle area of the cable with which it is used. Mixing rod 24 is usually constructed of materials which give it an equal or greater numerical aperature than the fibers in the bundle. This insures that light entering mixing block 24 at angles within the acceptance cone of the fibers will also propagate within mixing block 24. Light entering mixing block 24 from a single coupling rod at end 28 is spread over the entire mixing block 24 cross-sectional area and coupled into all of the rods 30 on end 26. The conformity of spreading depends upon the length-to-width ratio of mixing block 24 and also upon the shape of the block (cylindrical, rectangular, etc.).

Most of the light entering end 28 of mixing block 24 is transmitted through thin dielectric mirror 32 to cladded glass coupling rods 30 directly to other power equalizing couplers. Light transmitted by dielectric mirror 32 but not coupled into rods 30 is absorbed by attenuation material 34 which is coated on end 26 of mixing block 24. The small amount of light reflected back into mixing block 24 by mirror 32 is transmitted back to end 28 and to the local terminals by coupling rods 22. The amount of light returned to ports on the same coupler (local parts) is determined by the reflective properties of mirror 32 which facilitates the power equalizing required to reduce OSR to a small value. The reflective properties of dielectric mirror 32 are selected such that more light is transmitted by rods 30 than is reflected back to rods 22. This compensates for the additional cable and connector loss in the signal path between couplers 4. Similarly, light entering the coupler from end 26, that is from other power equalizing couplers, enters mixing block 24, is internally reflected and uniformly divided between ports on end 28.

Figure 3:
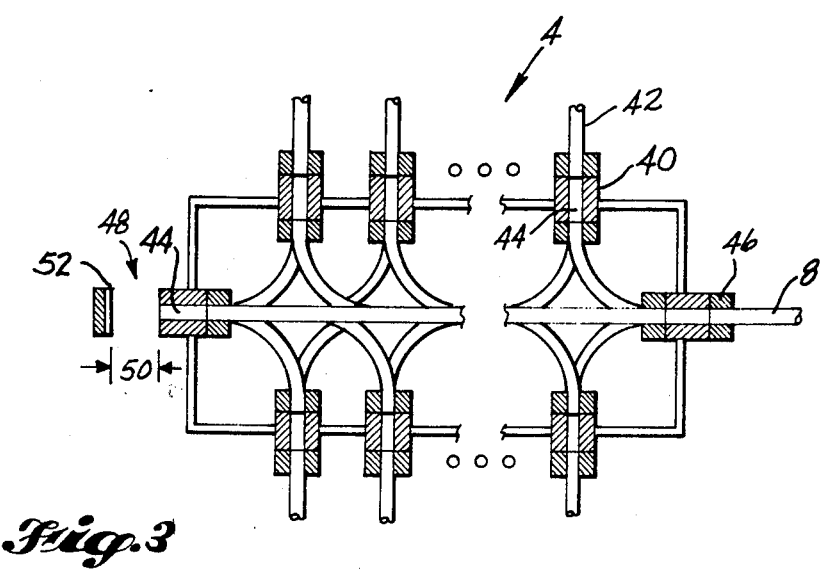
FIG. 3 shows an alternate embodiment of a coupler according to the present invention.

An alternate embodiment of the present invention is shown in FIG. 3. Optical signal power entering any one of the available input-output ports 40 by fiber optic cables 42 is applied to mixing rods 44. Mixing rods 44 are similar in function to mixing block 24 as has been described. Optical signals leaving mixing rods 44 are divided into two parts by physically separating the fiber bundle. One part of the divided bundle is routed to connector 46 containing a mixing rod which leads to other power equalizing multiport couplers. The other part is routed to attenuator 48, also containing a mixing rod, which controls the degree of optical coupling between local terminal parts 40.

As shown in FIG. 3, separation 50 controls the degree of optical coupling between local ports which can also be controlled by using mirror 52 with various reflectance or by using an absorption material between mirror 52 and mixing rod 44.

Accordingly, the foregoing disclosure and description thereof are for illustrative purposes only and do not in any way limit the invention which is only defined by the following claims.

What is claimed is:

1. A fiber optic data system comprising:
 a plurality of data terminals;
 at least two optical couplers,
 one coupler including a first port and a plurality of local second ports,
 the other coupler including a first port, a plurality of remote second ports, and first means for distributing a signal received at said first port thereof in equal parts to said remote second ports thereof;
 transmission means for optically connecting said first ports directly to one another;
 a plurality of optical conductors connecting each of said second ports to a different one of said terminals;
 transmitting means optically coupled to a terminal connected to one of said local ports for generating an optical input signal; and
 second means for dividing said input signal into a first signal portion and a second signal portion and delivering said first signal portion through said first port of said one coupler, for attenuating said second signal portion and delivering an equal part of the attenuated second signal portion to each of said local ports, and for controlling the ratio of power levels between said first and second signal portions and the degree of attenuation of the power level of said second signal portion, such that output signals of substantially equal power level are generated at all second ports in response to said input signal.

2. A fiber optic data system as claimed in claim 1 wherein all said optical couplers are identical to one another.

3. A fiber optic data system as claimed in claim 1 wherein said second means comprises means for absorbing a portion of said second signal portion and reflecting the remainder of said second signal portion to said local ports.

4. A fiber optic data system as claimed in claim 1 wherein said one coupler includes:

at least one first coupling rod connected to said first port thereof, a plurality of second coupling rods connected to said second port thereof, a mixing block optically connected between said first coupling rod and said second coupling rods with a first end portion of said block adjacent said first port and a second end portion of said block adjacent said second ports, and means at said second end portion of said block for absorbing a portion of said second signal portion and reflecting the remainder of said second signal portion to said local ports.

5. A fiber optic data system as claimed in claim 1 wherein said first port of said one coupler includes a first mixing rod and each second port of said one coupler includes a different second mixing rod, and wherein said second means comprises:

a third mixing rod and a means spaced from said third mixing rod for absorbing a portion of said second signal portion and reflecting the remainder of said second signal portion to said local ports, and a fiber bundle including distinct optic conductors each connecting a different second mixing rod to said third mixing rod, and distinct optic conductors each connecting a different second mixing rod to said first mixing rod.

6. A fiber optic data system as claimed in claim 5 wherein the degree of attenuation of said second signal portion is controlled by the magnitude of the spacing between said third mixing rod and said means for absorbing a portion of said second signal portion and reflecting the remainder of said second signal portion to said local ports.

7. A fiber optic data system comprising:

a plurality of optical transceivers for generating input signals and receiving output signals;

a plurality of couplers each including a first port and a plurality of second ports;

conductor means for optically interconnecting said couplers at the first ports thereof; and a plurality of optical conductors for connecting said second ports to different ones of said transceivers;

each said coupler including first means for dividing an input signal received at one of said second ports into a first signal portion and a second signal portion, attenuating said second signal portion, transmitting said first signal portion in equal parts to the other couplers, and transmitting the attenuated second signal portion in equal parts to the second ports on the same coupler in the form of output signals;

said first means including means for controlling the ratio of said first and second signal portions and the degree of attenuation of said second signal portion such that the magnitudes of the output signals at all said second ports in response to an input signal are substantially equal.

8. A fiber optic data system as claimed in claim 7 wherein said first means includes means for absorbing a portion of said second signal portion and reflecting the remainder of said second signal portion to said ports on said same coupler.

9. A fiber optic data system as claimed in claim 7 wherein each said coupler includes:

at least one first coupling rod connected to said first port thereof, a plurality of second coupling rods connected to said second ports thereof, a mixing block optically connected between said first coupling rod and said second coupling rods with a first end portion of said block adjacent said first port and a second end portion of said block adjacent said second ports, and means at said second end portion of said block for absorbing a portion of said second signal portion and reflecting the remainder of said second signal portion to said ports on said same coupler.

10. A fiber optic data system as claimed in claim 7 wherein each first port includes a different first mixing rod and each second port includes a different second mixing rod, and wherein said first means and said second means together comprise:

a third mixing rod, means spaced from said third mixing rod for absorbing a portion of said second signal portion and reflecting the remainder of said second signal portion to said ports on the same coupler, and a fiber bundle including distinct optic conductors each connecting a different second mixing rod to said third mixing rod, and distinct optic conductors each connecting a different second mixing rod to said first mixing rod.

11. A fiber optic data system as claimed in claim 10 wherein the degree of attenuation of said second signal portion is controlled by the magnitude of the spacing between said third mixing rod and said means for absorbing a portion of said second signal portion and reflecting the remainder of said second signal portion to said ports on the same coupler.

12. A fiber optic data system comprising:

means including a plurality of data terminals for generating optical input signals and receiving optical output signals;

at least three optical couplers each including a first port and a plurality of second ports;

a plurality of first bi-directional optical waveguides each connecting a different one of said second ports to a corresponding one of said data terminals; and at least three individual second bi-directional waveguides interconnecting said first ports such that only one individual waveguide is connected directly between any two of said optical couplers;

each said optical coupler including signal dividing and attenuating means for dividing an input signal received at one of said second ports into a first signal portion and a second signal portion, attenuating said second signal portion, transmitting said first signal portion in equal parts to the other couplers, and transmitting the attenuated second signal portion in equal parts to the second ports on the same coupler in the form of output signals;

said dividing and attenuating means including means for controlling the ratio of said first and second signal portions and the degree of attenuation of said second signal portion such that the magnitudes of the output signals at all said second ports in response to an input signal are substantially equal.

13. A fiber optic data system as claimed in claim 12 wherein each said optical coupler includes:

at least two first coupling rods connected between the first port thereof and the second waveguides connected thereto, a plurality of second coupling rods each connected between a different second port thereof and the first waveguide connected to that particular second port, a mixing block optically connected between said first port and said second ports with a first end portion of said mixing block adjacent said first port and a second end portion of said mixing block adjacent said second ports, and means at said second end portion of said mixing block for attenuating said second signal portion and reflecting the attenuated second signal portion to said second ports on the same optical coupler.

14. A fiber optic data system as claimed in claim 12 wherein each said optical coupler includes:

at least two first coupling rods connected between the first port thereof and the second waveguides connected thereto, and a plurality of second coupling rods each connected between a different second port thereof and the first waveguide connected to that particular second port, said signal dividing and attenuating means including (1) a third coupling rod, (2) means spaced from said third coupling rod for attenuating said second signal portion and reflecting the attenuated second signal portion to the second ports on the same coupler, and (3) a fiber bundle including (a) distinct optic conductors each connecting a different second coupling rod to said third coupling rod, and (b) distinct optic conductors each connecting a different second coupling rod to said first port.

15. A fiber optic data system as claimed in claim 14 wherein the degree of attenuation of said second signal portion is controlled by the magnitude of the spacing between said third coupling rod and the means spaced from said third coupling rod.

16. A method for coupling optical signals in a fiber optic data system including a plurality of terminals each capable of both generating optical input signals and receiving optical output signals, and a plurality of optical couplers each having a first port connected to the other couplers of the system and a plurality of second ports each connected to a different one of said terminals; said method comprising the steps of:

receiving an input signal from one of said input terminals at one of the couplers and dividing said input signal into a first signal and a second signal, dividing said first signal into a plurality of third signals of substantially equal magnitude and transmitting a different one of said third signals to each of the other couplers of the system, dividing each third signal into a plurality of fourth signals of substantially equal magnitude and delivering a different one of said fourth signals to each of said second ports of the other couplers, attenuating the second signal, transmitting the second signal to the second ports on the one coupler, dividing the second signal into a plurality of fifth signals of substantially equal magnitude so that each second port of said one coupler receives a different one of said fifth signals, and controlling both the division of said input signal and the attenuation of said second signals such that said fifth signals at said second ports of said one coupler and said fourth signals at said second ports of said other couplers cause a plurality of output signals of substantially equal magnitude to be delivered one each to all terminals of said fiber optic data system.

* * * * *